United States Patent Office 3,133,915
Patented May 19, 1964

3,133,915
17-[N-(TERTIARY-AMINO) ALKYL]IMINO - 5α - ANDROSTAN-3-OLS, ESTERS THEREOF, AND 5,6-DEHYDRO DERIVATIVES CORRESPONDING
Raymond E. Counsell, Skokie, and Paul D. Klimstra, Northbrook, Ill., assignors to G. D. Searle & Co., Chicago, Ill., a corporation of Delaware
No Drawing. Filed July 12, 1962, Ser. No. 209,292
15 Claims. (Cl. 260—239.5)

The present invention is concerned with novel steroidal compounds characterized by a >C=N— moiety at the 17-position and, more particularly, with 17-[N-(tertiary-amino)alkyl]imino-5α-androstan-3-ols, the 3-esters thereof, and the 5,6-dehydro derivatives corresponding, which compounds are represented by the structural formula

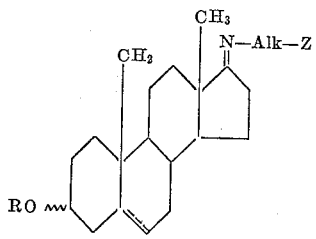

In that diagrammatic representation, R is hydrogen or a lower alkanoyl radical, Alk is a lower alkylene radical, Z can be an hydroxy or a di-(lower alkyl)amino, cyclo-(lower alkyl)amino, 4-(lower alkyl)piperazino, or morpholino radical, the wavy line is indicative of the optional "α" or "β" configuration at carbon 3, and the dotted line designates the optional presence of a double bond between carbon atoms 5 and 6.

Examples of lower alkanoyl radicals are formyl, acetyl, propionyl, butyryl, valeryl, caproyl and the branched-chain isomers thereof, while the lower alkylene radicals represented by Alk are typified by methylene, ethylene, trimethylene, tetramethylene, penetamethylene, and the branched-chain groups isomeric therewith. The lower alkyl radicals represented in the foregoing structural formula are exemplified by methyl, ethyl, propyl, butyl, pentyl, hexyl, and the corresponding branched-chain groups. Illustrative of the cyclo(lower alkyl)amino radicals comprehended by the Z term are pyrrolidino and piperidino.

The novel compounds of the present invention can be conveniently prepared by utilizing as a starting material the 3α or 3β isomer of 3-hydroxyandrost-5-en-17-one, of 3-hydroxy-5α-androstan-17-one, or a lower alkanoate ester thereof. Condensation of the appropriately-substituted amine with a member of the latter group of 17-keto starting materials in the presence of an acidic catalyst produces the instant 17-imino substances, characterized by a >C=N— grouping. Specific illustrations of this process are the reaction of 3β-acetoxyandrost-5-en-17-one with either 3-dimethylaminopropylamine and a catalytic quantity of p-toluenesulfonic acid to yield 17-[N-(3-dimethylaminopropyl)imino]androst-5-en-3β-ol 3-acetate or with 2-hydroxyethylamine in the presence of p-toluenesulfonic acid as a catalyst, resulting in 17-[N-(2-hydroxyethyl)imino]androst-5-en-3β-ol 3-acetate.

Equivalent to the instant amines for the purposes of this invention are the corresponding non-toxic acid and quaternary salts, exemplified by the citrate, tartrate, maleate, ascorbate, gluconate, lactate, succinate, phosphate, sulfate, hydrobromide, hydrochloride, methiodide, ethiodide, methochloride, methobromide, methosulfate, and ethosulfate.

The compounds of this invention display valuable pharmacological properties. They are, for example, hormonal and anti-hormonal agents as is evidenced by their estrogenic, anti-fertility, androgen-inhibitory, and anti-anabolic activity. In addition, they are useful as intermediates to the amines disclosed and claimed in application Serial Nos. 98,745, filed March 28, 1961, now abandoned, and 156,136, filed November 30, 1961 now Patent No. 3,084,156, of which the present application is a continuation-in-part.

The invention is illustrated more fully by the examples which follow. These examples are set forth by way of illustration only, and it will be understood that the invention is not to be construed as limited in spirit or in scope by the details contained therein, as many modifications in materials and methods will be apparent from this disclosure to those skilled in the art. In these examples, temperatures are given in degrees centigrade (° C.). Quantities of materials are expressed in parts by weight unless otherwise noted.

Example 1

A mixture of 15 parts of 3β-acetoxyandrost-5-en-17-one, 8 parts of 2-dimethylaminoethylamine, 1.7 parts of p-toluenesulfonic acid monohydrate, and 160 parts of benzene is heated at reflux for about 4 hours, during which time the water formed is separated by means of a Dean-Stark water trap. The mixture is cooled and allowed to stand at room temperature for about 15 hours, then filtered to remove the precipitated p-toluensulfonic acid salt of 2-dimethylaminoethylamine. The solvent is removed by distillation in vacuo, and the residual solid is dissolved in ether, then treated with isopropanolic hydrogen chloride. The resulting hydrochloride is collected by filtration, washed with ether, and recrystallized from aqueous ethanol to afford pure 17-[N-(2-dimethylaminoethyl)-imino]androst-5-en-3βol 3-acetate dihydrochloride.

A solution of this dihydrochloride in water is made alkaline by the addition of dilute aqueous sodium carbonate. This alkaline mixture is extracted with chloroform, and the organic layer is washed with water, dried over anhydrous potassium carbonate containing decolorizing carbon and concentrated to dryness in vacuo. The resulting residue is crystallized from acetone to produce 17 - [N - (2 - dimethylaminoethyl)imino]androst - 5-en-3β-ol 3-acetate, M.P. about 97–99°. This substance is represented by the structural formula

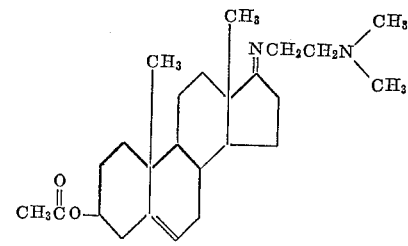

Example 2

A solution of 33 parts of 3β-acetoxyandrost-5-en-17- one and 20.4 parts of 3-dimethylaminopropylamine in 350 parts of benzene is heated at reflux until the separation of water ceases; then 3.6 parts of p-toluenesulfonic acid monohydrate is added, and refluxing together with water separation is continued for about 2 hours. This reaction mixture is cooled, washed with water, dried over anhydrous potassium carbonate, and evaporated to dryness under reduced pressure. Recrystallization of the residue from hexane affords pure 17-[N-(3-dimethylaminopropyl)-imino]androst-5-en-3β-ol acetate, M.P. about 86.5–88.5°; $[α]_D = -37°$ (chloroform). This compound is represented by the structural formula

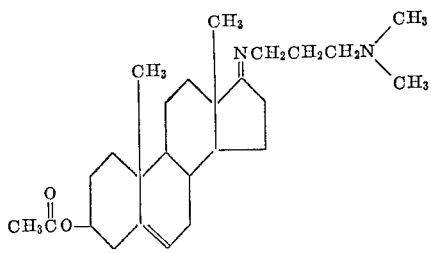

*Example 3*

To a solution of 25 parts of 3β-acetoxyandrost-5-en-17-one and 24 parts of 3-(N-methylpiperazino)propylamine in 200 parts of benzene is added 2.8 parts of p-toluenesulfonic acid monohydrate, and the resulting mixture is heated at reflux for about 4½ hours with concomitant removal of water, then cooled and filtered to remove the precipitated solid. The filtrate is washed with water, dried over anhydrous sodium sulfate containing decolorizing carbon, then stripped of solvent at reduced pressure. The resulting oil is crystallized from hexane to produce {17-N-[3-(N'-methylpiperazino)propyl]-imino}androst-5-en-3β-ol 3-acetate, M.P. about 98–100°. It is represented by the structural formula

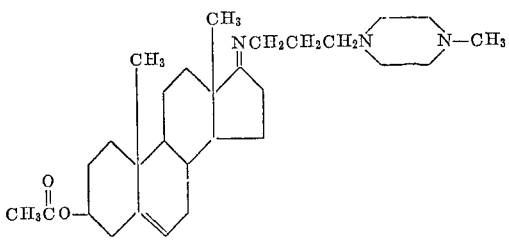

*Example 4*

A mixture of 25 parts of 3β-acetoxyandrost-5-en-17-one, 20 parts of 3-diethylaminopropylamine, 2.8 parts of p-toluenesulfonic acid monohydrate and 280 parts of benzene is heated at reflux for about 4½ hours with concomitant azeotropic removal of water. The reaction mixture is then cooled, washed with water, dried over anhydrous sodium sulfate containing decolorizing carbon and evaporated to dryness in vacuo. The resulting oily residue is crystallized from hexane to afford 17-[N-(3-diethylaminopropyl)imino]androst-5-en-3β-ol 3-acetate, M.P. about 51–52.5°. This substance is represented by the structural formula

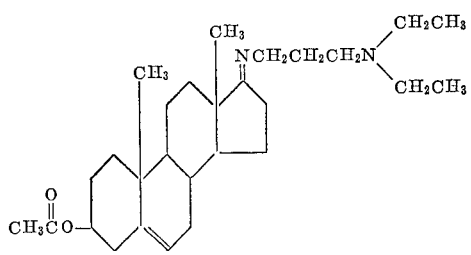

*Example 5*

A mixture consisting of 25 parts of 3β-acetoxyandrost-5-en-17-one, 20 parts of 3-piperidinopropylamine, 2.8 parts of p-toluenesulfonic acid monohydrate, and 280 parts of benzene is heated at reflux for about 4 hours, during which time the water of reaction is removed. The reaction mixture is cooled, clarified by filtration, then washed with water and dried over anhydrous sodium sulfate containing decolorizing carbon. The solvent is removed by distillation in vacuo, and the resulting residual oil is crystallized from hexane to afford 17-[N-(3-piperidinopropyl)imino]androst-5-en-3β-ol 3-acetate, M.P. about 80–83°. It is characterized further by the structural formula

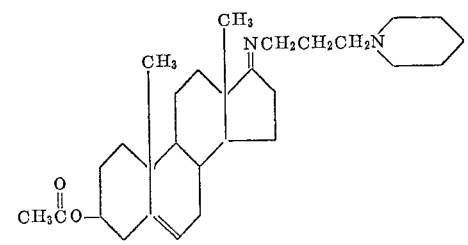

*Example 6*

The substitution of an equivalent quantity of 3-pyrrolidinopropylamine in the process of Example 3 results in 17-[N-(3-pyrrolidinopropyl)imino]androst-5-en-3β-ol 3-acetate, M.P. about 100–101°; $[α]_D = -36°$ (chloroform). This substance is represented by the structural formula

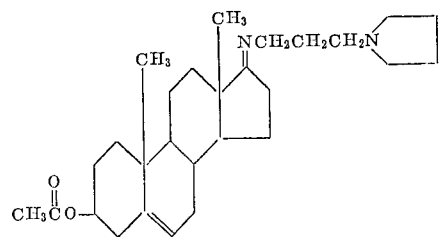

*Example 7*

A solution of 33.25 parts of 3β-acetoxy-5α-androstan-17-one, 12.25 parts of 3-dimethylaminopropylamine and 1.8 parts of p-toluenesulfonic acid monohydrate in 200 parts of benzene is heated at reflux, during which time the water of reaction is removed by means of a Dean-Stark water trap. The cooled reaction mixture is washed with water, dried over anhydrous potassium carbonate, and concentrated to dryness to afford a viscous oil consisting of 17-[N-(3-dimethylaminopropyl)imino]-5α-androstan-3β-ol 3-acetate. A solution of this free base in ether is treated with isopropanolic hydrogen chloride to yield the corresponding dihydrochloride; $[α]_D = -44.5°$ (methanol). The latter substance is represented by the structural formula

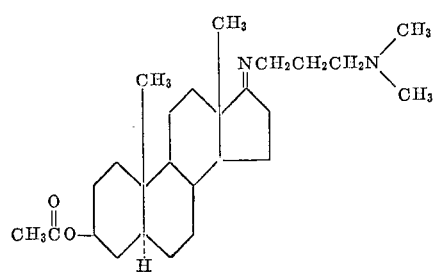

*Example 8*

A mixture of 16.5 parts of 3β-acetoxyandrost-5-en-17-one, 9 parts of 3-morpholinopropylamine, 0.9 part of p-toluenesulfonic acid monohydrate, 20 parts of pyridine and 87 parts of toluene is distilled slowly for about 6 hours, during which time approximately 100 parts by volume of distillate is collected. The reaction mixture is cooled, washed with water, dried over anhydrous sodium sulfate, and evaporated to dryness in vacuo to afford crystalline 17-[N-(3-morpholinopropyl)amino]androst-5-en-3β-ol 3-acetate. Recrystallization from hexane affords a pure sample, M.P. about 115–118°; [α]_D = −35.5° (chloroform). This compound is represented by the structural formula

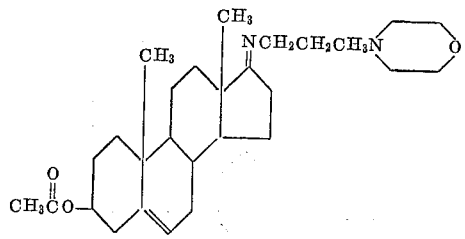

*Example 9*

A solution of 15 parts of 3α-hydroxy-5α-androstan-17-one and 220 parts of benzene is subjected to distillation to remove any moisture. To this anhydrous solution is added 9.4 parts of 3-dimethylaminopropylamine and 1.7 parts of p-toluenesulfonic acid, and the resulting reaction mixture is heated at reflux for about 5 hours, during which time the water of reaction is removed azeotropically. The solution is then cooled, washed with water, dried over anhydrous potassium carbonate, and concentrated to afford an oil, which solidifies on standing. Recrystallization from acetone-hexane yields 17-[N-(3-dimethylaminopropyl)imino]-5α-androstan-3α-ol, M.P. about 135–136°. It is characterized further by the structural formula

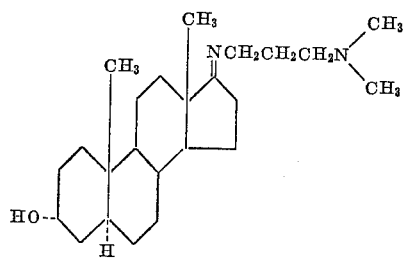

*Example 10*

A mixture of 16.5 parts of 3β-acetoxyandrost-5-en-17-one, 4 parts of 2-hydroxyethylamine, and 0.9 part of p-toluenesulfonic acid monohydrate with 160 parts of benzene is heated at reflux with stirring, during which time the water formed is removed by means of a water separator. The reaction is continued for about 5 hours, at the end of which time the mixture is allowed to cool, then is diluted with about 134 parts of methylene chloride and finally is washed with water. The organic solution is then dried over anhydrous sodium sulfate and stripped of solvent at reduced pressure. Recrystallization of the residue from chloroform-heptane affords pure 17-[N-(2-hydroxyethyl)imino]androst-5-en-3β-ol 3 acetate, melting at about 186–188° (dec.). It is characterized further by an optical rotation of −38° in chloroform and by the structural representation

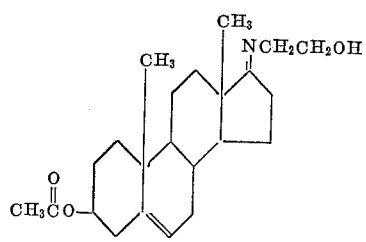

*Example 11*

To a solution of 14.5 parts of 3α-hydroxy-5α-androstan-17-one and 4 parts of 2-hydroxyethylamine in 160 parts of benzene is added 0.9 part of p-toluenesulfonic acid monohydrate and the resulting mixture is heated at reflux with stirring for about 2 hours, then is allowed to cool to room temperature. The resulting precipitate is collected by filtration and washed on the filter with pentane. Recrystallization of this crude product from isopropyl alcohol-ethyl acetate results in pure 17-[N-(2-hydroxyethyl)imino]-5α-androstan-3α-ol, which melts at about 182–186° (dec.) and is further characterized by an optical rotation of +47.5° in chloroform. It is represented by the following structural formula

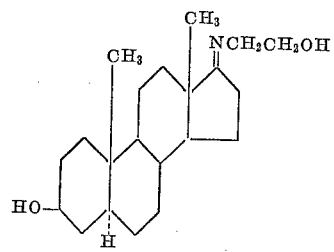

*Example 12*

A mixture of 14.5 parts of 3β-hydroxyandrost-5-en-17-one, 4 parts of 2-hydroxyethylamine, 0.9 part of p-toluenesulfonic acid monohydrate and 160 parts of benzene is heated at reflux with stirring for about 2 hours, then is allowed to cool to room temperature. The crystalline product which separates is collected by filtration, washed with benzene, and recrystallized from methanol-isopropyl alcohol to yield pure 17-[N-(2-hydroxyethyl)imino]-androst-5-en-3β-ol, melting at about 206–210° (dec.), and displaying an optical rotation of −20.5° in methanol. Its structural formula is shown below

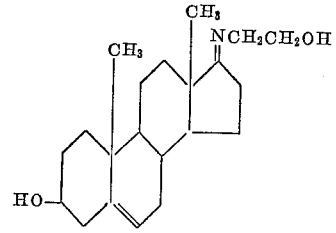

*Example 13*

The reaction of 17.2 parts of 3β-propionoxyandrost-5-en-17-one, 4.9 parts of 3-hydroxypropylamine, and 0.9 part of p-toluenesulfonic acid monohydrate by the procedure of Example 10 results in 17-[N-(3-hydroxypropyl)-imino]androst-5-en-3β-ol 3-propionate.

What is claimed is:
1. A compound of the structural formula

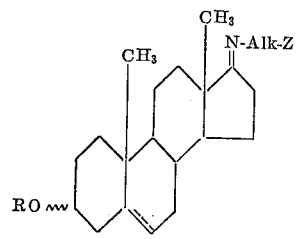

wherein R is selected from the group consisting of hydrogen and lower alkanoyl radicals, Alk is a lower alkylene radical, Z is selected from the group consisting of an hydroxyl radical, di-(lower alkyl)amino radicals, cyclo (lower alkyl)amino radicals, 4-(lower alkyl)piperazino radicals, and the morpholino radical, and the dotted line indicates the optional presence of a double bond between carbon atoms 5 and 6.

2. 17 - {N - [3-(N'-methylpiperazino)propyl]-imino} androst-5-en-3β-ol 3 acetate.

3. 17 - [N-(3-dimethylaminopropyl)imino]-5α-androstan-3α-ol.

4. A compound of the structural formula

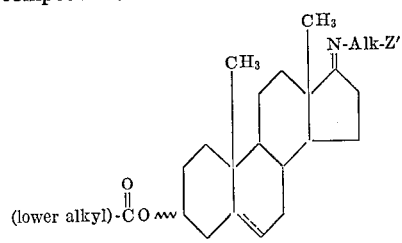

wherein Alk is a lower alkylene radical, Z' is the residue of an aliphatic secondary amine containing less than 13 carbon atoms, and the dotted line indicates the optional presence of a double bond between carbon atoms 5 and 6.

5. 17 - [N - (2-dimethylaminoethyl)imino]androst-5-en-3β-ol 3-acetate.
6. 17 - [N - (3-dimethylaminopropyl)imino]androst-5-en-3β-ol 3-acetate.
7. 17 - [N - (3-diethylaminopropyl)imino]androst-5-en-3β-ol 3-acetate.
8. 17 - [N - (3-piperidinopropyl)imino]androst-5-en-3β-ol 3-acetate.
9. 17 - [N - (3-pyrrolidinopropyl)imino]androst-5-en-3β-ol 3-acetate.
10. 17 - [N - (3-dimethylaminopropyl)imino]-5α-androstan-3β-ol 3-acetate.
11. 17 - [N - (3-morpholinopropyl)imino]androst-5-en-3β-ol 3-acetate.

12. A compound of the structural formula

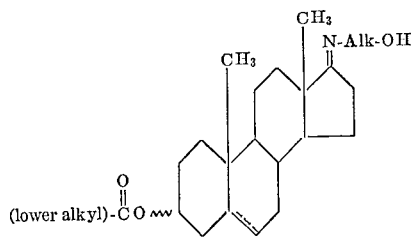

wherein Alk is a lower alkylene radical and the dotted line indicates the optional presence of a double bond between carbon atoms 5 and 6.

13. 17 - [N-(2-hydroxyethyl)imino]androst-5-en-3β-ol 3-acetate.
14. 17 - [N - (2 - hydroxyethyl)imino] - 5α-androstan-3α-ol.
15. 17-[N-(2-hydroxyethyl)imino]androst-5-en-3β-ol.

No references cited.